US012722655B2

(12) United States Patent
Caldwell et al.

(10) Patent No.: US 12,722,655 B2
(45) Date of Patent: Sep. 1, 2026

(54) NAVIGATING AROUND BLOCKING OBJECTS

(71) Applicant: Zoox, Inc., Foster City, CA (US)

(72) Inventors: Timothy Caldwell, Mountain View, CA (US); Rasmus Fonseca, Boulder Creek, CA (US); Dhanushka Nirmevan Kularatne, Castro Valley, CA (US); Joseph Lorenzetti, Foster City, CA (US); Latheepan Murugathasan, Dublin, CA (US); Jack Riley, San Francisco, CA (US); Mazen Alim Siddiqui, San Francisco, CA (US); Olivier Amaury Toupet, Escondido, CA (US)

(73) Assignee: Zoox, Inc., Foster City, CA (US)

(*) Notice: Subject to any disclaimer, the term of this patent is extended or adjusted under 35 U.S.C. 154(b) by 134 days.

(21) Appl. No.: 18/138,359

(22) Filed: Apr. 24, 2023

(65) Prior Publication Data

US 2024/0351605 A1 Oct. 24, 2024

(51) Int. Cl.

*B60W 60/00* (2020.01)
*B60W 30/09* (2012.01)
*B60W 40/02* (2006.01)

(52) U.S. Cl.

CPC .......... *B60W 60/001* (2020.02); *B60W 30/09* (2013.01); *B60W 40/02* (2013.01); *B60W 2520/00* (2013.01); *B60W 2554/80* (2020.02)

(58) Field of Classification Search

CPC .... B60W 60/001; B60W 30/09; B60W 40/02; B60W 2520/00; B60W 2554/80;

(Continued)

(56) References Cited

U.S. PATENT DOCUMENTS 10,649,459 B2 5/2020 Wang et al.
10,921,811 B2 2/2021 Levinson et al.

(Continued)

FOREIGN PATENT DOCUMENTS

CN 115079699 A 9/2022
WO WO2018093754 A1 5/2018

OTHER PUBLICATIONS

U.S. Appl. No. 16/697,096, filed Nov. 26, 2019, Havlak, et al., "Adverse Prediction Planning", 53 pages.

(Continued)

*Primary Examiner* — Mohamed Abdo Algehaim
(74) *Attorney, Agent, or Firm* — Lee & Hayes, P.C.

(57) ABSTRACT

Techniques for enabling a vehicle to navigate around a blocking object, such as double-parked vehicle ("DPV"), are discussed herein. In some examples, a vehicle may receive sensor data representative of an environment. The vehicle may analyze such sensor data to determine that a DPV is located proximate the vehicle. When determining whether to follow the trajectory, the vehicle may determine one or more cost values corresponding to the trajectory. Further, the vehicle may receive weighted heatmap(s) that cover the region proximate the DPV. The vehicle may modify some or all cost values of the trajectory based on the weighted values of the heatmap(s). In some examples, the vehicle may follow the trajectory based at least in part on the cost values.

20 Claims, 8 Drawing Sheets

(58) Field of Classification Search
CPC ....... B60W 30/0956; B60W 30/18163; B60W 60/0011; B60W 60/0027
USPC .......................................................... 701/23
See application file for complete search history.

(56) References Cited

U.S. PATENT DOCUMENTS 10,955,851 B2 3/2021 Ghafarianzadeh et al.
11,126,180 B1 9/2021 Kobilarov
11,188,082 B2 11/2021 Silva et al.
11,964,670 B1 * 4/2024 Van Alsenoy ..... G01C 21/3837
2015/0367848 A1 * 12/2015 Terashima ........ B60W 30/0956 701/25
2018/0196439 A1 * 7/2018 Levinson .......... B60W 60/0027
2019/0146508 A1 * 5/2019 Dean .................... G05D 1/0285 701/26
2019/0220015 A1 * 7/2019 Phillips .................... G05D 1/65
2019/0220030 A1 * 7/2019 Ohmura ............ B60W 30/0953
2019/0250626 A1 * 8/2019 Ghafarianzadeh ... G08G 1/0145
2019/0317520 A1 * 10/2019 Zhang .................. G05D 1/0214
2019/0332118 A1 * 10/2019 Wang ................... G05D 1/0238
2019/0333386 A1 * 10/2019 Horita .................... G08G 1/166
2019/0377351 A1 * 12/2019 Phillips ................. B60W 50/00
2020/0049511 A1 * 2/2020 Sithiravel ............ G01S 13/865
2020/0139959 A1 * 5/2020 Akella ................. G05D 1/0088
2020/0139967 A1 * 5/2020 Beller ...................... G05D 1/81
2020/0174481 A1 * 6/2020 Van Heukelom .... G05D 1/0214
2020/0225669 A1 * 7/2020 Silva ....................... G01S 17/06
2020/0398894 A1 * 12/2020 Hudecek .............. G05D 1/0214
2021/0061293 A1 * 3/2021 Bacchus ............. G06F 18/2415
2021/0114617 A1 * 4/2021 Phillips .............. G01C 21/3453
2021/0114621 A1 * 4/2021 Komuro ................ B60W 10/20
2021/0133466 A1 * 5/2021 Gier ..................... G05D 1/0223
2021/0261159 A1 * 8/2021 Pazhayampallil .... B60W 30/09
2021/0394749 A1 * 12/2021 Horigome ....... B60W 30/18163
2022/0089151 A1 * 3/2022 Gyllenhammar ...... G08G 1/166
2022/0089192 A1 * 3/2022 Gyllenhammar ............................ B60W 60/0059
2022/0276654 A1 * 9/2022 Lee ...................... G05D 1/0214
2023/0242145 A1 * 8/2023 Tsuchiya ............. B60W 60/001 701/23

OTHER PUBLICATIONS

U.S. Appl. No. 16/856,996, filed Apr. 23, 2020, Dax, et al., "Collision Avoidance for Vehicles With Right of Way", 67 pages.
U.S. Appl. No. 17/850,348, filed Jun. 27, 2022, Crane, et al., "Determining Right of Way", 41 pages.
U.S. Appl. No. 18/072,015, filed Nov. 30, 2022, Narayanan, et al., "Vehicle Trajectory Tree Search for Off-Route Driving Maneuvers", 66 pages.
PCT Search Report and Written Opinion for Application No. PCT/US2024/023147, mailed on Aug. 2, 204, 10 pages.

* cited by examiner

300

500
502
504
506
508
510
512
514
516
518

NAVIGATING AROUND BLOCKING OBJECTS

BACKGROUND

Autonomous vehicles may utilize various sensor devices to detect static and/or dynamic objects within the environment while navigating. In some instances, such as when the sensor devices detect a stationary object in the same lane as the vehicle, the vehicle may determine whether to stay in the current lane and wait behind the stationary object or perform an alternate maneuver. Certain techniques for trajectory selection which favor waiting may be suboptimal and can result in the vehicle waiting behind the stationary object for unknown and potentially large amounts of time, making these techniques unsuitable for real-time driving scenarios, such as with delivery of goods, passengers, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
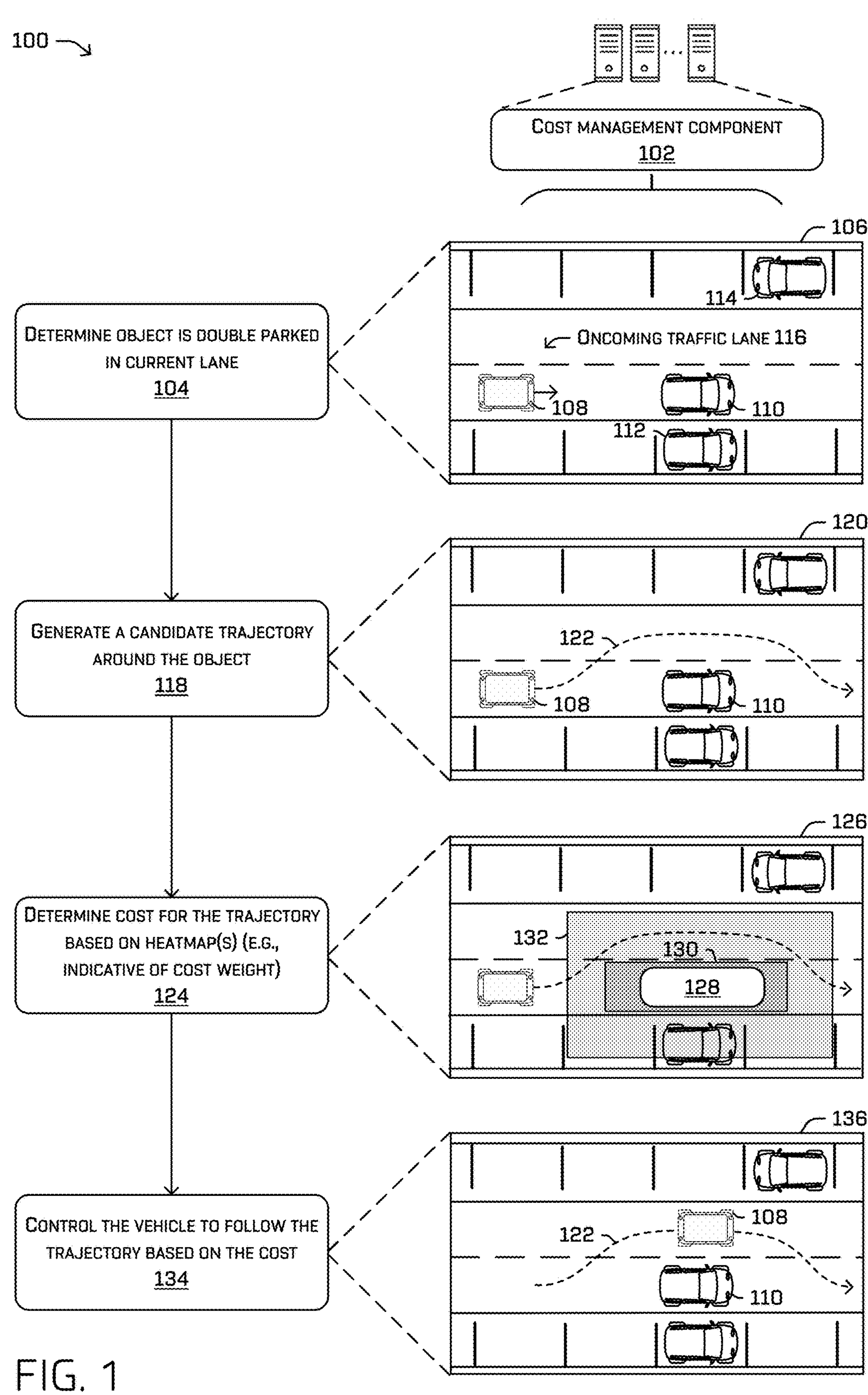
FIG. 1 is a pictorial flow diagram illustrating an example technique for determining that a double-parked vehicle (DPV) is blocking the vehicle's lane, generating a trajectory around the DPV, determining a cost of the trajectory based on weighted heatmaps, and controlling the vehicle based on the cost, in accordance with one or more examples of the disclosure.

As discussed above, techniques for determining whether to wait behind or go around a stationary object, such as a double-parked vehicle, may be suboptimal and can result in the vehicle spending excessive amounts of time waiting behind such double-parked vehicles (also referred to as "blocking objects").

Techniques for enabling a vehicle to navigate around a double-parked vehicle are discussed herein. As described herein, weighted heatmaps may be utilized to alter costs associated with generation of a trajectory which may enable a vehicle to enter an oncoming traffic lane to go around a double-parked vehicle ("DPV"). In some examples, a vehicle (such as an autonomous vehicle) may receive sensor data representative of an environment. The vehicle may analyze such sensor data to determine that a DPV is located within the same lane as the vehicle. In some instances, the vehicle may generate a trajectory that leads the vehicle into an oncoming lane of traffic in order to navigate around the DPV. Throughout the disclosure, such a trajectory may be associated with a potential action for the vehicle to take (which may be among a plurality of actions evaluated independently and/or over a tree search), a resultant trajectory determined as part of an optimization procedure, or otherwise. When determining whether to follow the trajectory, the vehicle may determine one or more cost values (e.g., comfort cost, legality cost, safety cost, progress cost, etc.) corresponding to the trajectory. In such instances, the vehicle may receive or otherwise determine one or more weighted heatmaps that cover the region surrounding and/or proximate the DPV. The vehicle may modify some or all cost values of the trajectory based on the weighted values of the heatmap(s). In some examples, the vehicle may select or otherwise determine to follow the trajectory based at least in part on the cost values. As discussed throughout this disclosure, the techniques described herein may improve vehicle safety and/or driving efficiency by ensuring that the vehicle determines cost values that accurately represent the cost for following a trajectory, thereby allowing the vehicle to perform safer and more efficient driving maneuvers.

When determining whether to wait behind or go around a DPV, conventional techniques may result in suboptimal and/or insufficient results. For example, a vehicle may transport a passenger between pickup and drop off locations. While transporting the passenger, the vehicle may approach a stationary object blocking the vehicle's path (e.g., impeding the vehicle's progress). In such instances, the stationary vehicle may be double parked alongside an already parked vehicle. Further, in an environment where vehicles drive on the right side of the road, the lane to the left of the stationary vehicle may be an oncoming traffic lane. In such examples, as the vehicle approaches the blocking stationary vehicle, the vehicle may determine whether to yield behind and wait for the stationary vehicle to move, or the vehicle may determine whether it is safe to enter the oncoming traffic lane (e.g., on the left of the stationary vehicle) to go around the stationary vehicle. When determining which action to follow, the vehicle may determine a cost for some or all trajectories. In such instances, based on the trajectory that leads the vehicle around the stationary vehicle, the vehicle may determine that the cost of following such a trajectory is too high. Accordingly, the vehicle may decide to wait behind the stationary vehicle for unnecessary and/or unknown amounts of time. However, in such instances, when determining the cost values for the trajectory that navigates around the stationary vehicle, the vehicle may determine high cost values merely because the trajectory causes the vehicle to enter an oncoming traffic lane. As such, the cost values may preclude the vehicle from navigating around the stationary vehicle even when doing so has little risk (e.g., no oncoming vehicles). Consequently, the limitations to conventional techniques may result in suboptimal trajectory selection determinations, thereby increasing the likelihood that a vehicle unnecessarily waits behind a stationary vehicle.

To address these and other technical problems and inefficiencies, the systems and/or techniques described herein include a cost management system (which also may be referred to as a "cost management component" or a "cost manager") configured to enable vehicles to navigate into an oncoming traffic lane to go around a DPV. Further, the cost management component may leverage one or more weighted heatmaps to increase or decrease cost values. Technical solutions discussed herein solve one or more technical problems associated with spending excessive amounts of time unnecessarily waiting behind DPVs.

Initially, a cost management component may identify one or more stationary vehicles within the environment. While a vehicle navigates within an environment, the cost management component may detect or otherwise identify one or more stationary vehicles. For instance, the cost management component may identify stationary vehicles based on receiving a list of one or more stationary vehicles from one or more components of the vehicle and/or analyzing sensor data captured from one or more sensors located on the vehicle.

For instance, the cost management component may receive a list of one or more stationary vehicles from a prediction component, perception component, planning component, and/or any other component of the vehicle. In such instances, such components may receive sensor data from one or more sensors of the autonomous vehicle traversing within the environment. In some instances, the vehicle may include one or more sensor devices located and/or mounted at various locations and/or angles on the vehicle. In some cases, such sensor devices may include lidar devices, radar devices, image capturing devices, time-of-flight devices, infrared devices, and/or any other type of sensor device. In such instances, the component may analyze such sensor data to detect an object within the environment. Further, the component(s) may determine that the object is a stationary object based at least in part on determining a stationary intent (e.g., the object is predicted to remain stationary). In such instances, the component(s) may send a list of stationary object(s) to the cost management component. Example techniques for detecting or otherwise determining stationary objects can be found, for example, in U.S. Pat. No. 11,188,082, filed Jan. 11, 2019, and titled "Occlusion Prediction and Trajectory Evaluation," as well as in U.S. Pat. No. 10,955,851, filed Feb. 14, 2018, and titled "Detecting Blocking Objects" the contents of which is herein incorporated by reference in its entirety and for all purposes.

In some examples, the cost management component may identify one or more DPVs based on analyzing the list of stationary objects. A DPV may be a blocking vehicle. The DPV may also be a parked (e.g., velocity below a threshold value) vehicle laterally adjacent to an already parked vehicle along the side of a road. Additionally or alternatively, a DPV may be a parked vehicle proximate the side of a road without a laterally adjacent parked vehicle. As such, the cost management component may determine whether and/or to what degree the stationary vehicle(s) are located within a lane adjacent to the side of the road. For instance, a stationary object may be considered a DPV if more than a threshold amount or percentage of the lane is covered by the stationary object. The cost management component may evaluate some or all of the stationary vehicle(s) to determine on or more DPVs.

In some examples, the cost management component may generate or otherwise receive one or more trajectories based on the DPV(s). In some instances, the planner component of the vehicle may determine trajectories that lead the vehicle around the DPV and/or lead the vehicle to a location behind the DPV. The planner component may determine the trajectories based on map data and the desired destination of the vehicle, as well as the classifications, positions, and predicted trajectories of the other objects in the environment. Examples of various techniques for generating planner trajectories for autonomous vehicles can be found, for example, in U.S. Pat. No. 10,921,811, filed on Jan. 22, 2018, issued on Feb. 16, 2021, and titled, "Adaptive Autonomous Vehicle Planner Logic," and U.S. Pat. No. 10,955,851, filed on Feb. 14, 2018, issued on Mar. 23, 2021, and titled, "Detecting Blocking Objects," each of which is incorporated by reference herein in its entirety.

In some examples, the cost management component may receive or otherwise determine one or more weighted heatmaps which may be used to increase or decrease cost values of a trajectory. The cost management component may determine the weighted heatmaps during a pre-computation stage and/or by a remote server-based system. For example, a pre-computation stage may be a moment in which the vehicle turns on, initializes, and/or any other situation. As such, the cost management component may receive and/or request the previously generated heatmap(s) when approaching a DPV. Generating the weighted heatmaps during a pre-computation stage may improve computational efficiency by reducing the amount of processing for the vehicle to perform in real-time scenarios.

In some examples, the cost management component may receive or generate a first heatmap which includes weight data that increases some cost values of a trajectory, and a second heatmap which includes weight data that decreases other cost values of a trajectory. The first heatmap may cover a region of the environment that surrounds and/or is proximate to the DPV. The second heatmap may cover a region of the environment that surrounds and/or is adjacent to the first heatmap. In some examples, the size and/or dimensions of the first and/or second heatmaps may be based on a variety of factors, such as a dilated DPV, a size (or dilated size) of the DPV (e.g., increase heatmap(s) length for larger DPV; decrease heatmap(s) length for smaller DPV), an orientation of the DPV, a velocity of the vehicle (e.g., increase the heatmap(s) length according to increased velocity), semantic information regarding the environment (such as a lane width, traffic signs, etc.), a distance between the vehicle and the DPV, a type of vehicle, a difference in velocity between the vehicle and the DPV, a pose of the vehicle, a kinematic (e.g., a turning radius, an acceleration ability, etc.) and/or dynamic attribute of the vehicle, a predicted acceleration and/or predicted acceleration capability of the object, and/or any other factor.

In some examples, the cost management component may determine a dilated DPV. As it may be difficult for a vehicle to know the absolute length of the DPV, and as the DPV may resume movement at any time, the vehicle may determine a dilated DPV such that the size and/or shape of the DPV provides a buffer to account for uncertainties. In some instances, the vehicle may determine a type and/or predicted size of the DPV and utilize such information to determine the degree to which the DPV is to be dilated. The degree to which the DPV is dilated may be based on a type of DPV, predicted acceleration capabilities of the DPV (e.g., increase the dilation size based on the DPV having high acceleration capabilities; decrease the dilation size based on the DPV having low acceleration capabilities), a distance between the vehicle and the DPV (e.g., larger distance may increase DPV uncertainty and as such increase dilation size), a velocity of the vehicle, a confidence level the DPV will remain stationary, and/or any other factor.

In some examples, the first and/or second heatmaps may include different weight values. For instance, the cost management component may assign a weight value (or values) to the first heatmap that, when combined with a cost value, changes the cost value to a higher value. Further the cost management component may assign a weight value (or values) to the second heatmap that, when combined with a cost value, changes the cost value to a lower value. In some examples, the first and/or second heatmaps may include one or more weights. For example, the first and/or second heatmaps may include a single weight for the entirety of the heatmap. Alternatively, the first and/or second heatmaps may be discretized into one or more cells such that some or all cells have varying weight values.

In some examples, the cost management component may determine an overall cost for some or all of the trajectories. An overall cost for a trajectory may represent and/or be indicative of the combination of one or more sub-costs. A cost value can indicate the safety, risk, convenience, and/or efficiency of a trajectory. For instance, a high cost value may indicate heightened degree of risk, danger, inconvenience, and/or inefficiency of the trajectory. In contrast, low cost values may indicate a lower degree of risk, danger, inconvenience, and/or inefficiency of the trajectory. In some examples, sub-costs may include comfort related costs (e.g., acceleration cost, jerk cost, steering cost, path reference cost, etc.), legality related costs, policy related costs, safety related costs, progress costs, debris cost, an exit cost, an approach cost, a space cost, a payment cost, a yaw cost, and/or any other type of cost. In such instances, the cost management component may combine the various costs into a single overall cost. Such costs may be weighted differently, and as such, different costs may affect the overall cost in different proportions.

In some examples, the cost management component may modify some or all sub-costs based on the weight values of the first and/or second heatmaps. For example, the cost management component may determine that the trajectory passes through the first and/or second heatmaps. Based on the trajectory passing through the heatmap(s), the cost management component may modify (e.g., multiply) the cost value with the weight data within the heatmap. Alternatively or additionally, the cost management component may modify one or more cost values based on determining that an end of the trajectory is located within the first or second heatmap.

In some examples, the cost management component may determine to follow the trajectory. In some examples, the cost management component may select or otherwise determine a trajectory to follow based on a sum of one or more costs. In such instances, the cost management component may select the trajectory with the lowest overall cost. The cost management component may determine which trajectory to follow based on inputting some or all of the sub-costs into a tree search. In such a tree search, trajectories may be selected and/or optimized based on associated costs, including all costs to arrive at a node along the tree (e.g., cost-to-come) and a cost to arrive at a final destination from the node (e.g., cost-to-go). Techniques for generating a trajectory based at least in part on a tree search may be found, for example, in U.S. patent application Ser. No. 18/072,015 entitled "Vehicle Trajectory Tree Search for Off-Route Driving Maneuvers" filed on Nov. 30, 2022, the entire contents of which are hereby incorporated by reference herein for all purposes.

In some examples, the cost management component may control the vehicle based on trajectory. Upon identifying the trajectory with the lowest overall cost, the vehicle may follow the trajectory. For example, if the trajectory that goes around the DPV has the lowest overall cost, the vehicle may follow the trajectory into the oncoming lane of traffic and around the DPV, despite being against a policy, for example. Alternatively, if the trajectory that waits behind the DPV has the lowest overall cost, the vehicle may follow the trajectory to a location behind the DPV and wait until the DPV resumes movement.

Additionally or alternatively, the cost management component may determine one or more cost values that are not affected by the first or second heatmaps. As discussed above, the second heatmap may lower cost values enough such that the vehicle can go into an oncoming traffic lane to go around a DPV. As such, the cost management component may determine additional costs that are not lowered and which ensure the vehicle accurately measures the risk posed by vehicles approaching in the oncoming traffic lane or objects potentially located in an occluded region behind the DPV. In some examples, such costs may be included and considered when determining which trajectory to follow. In some examples, the cost management component may determine an adversarial vehicle cost indicating the degree of uncertainty associated with oncoming vehicle trajectories and/or an occluded collision cost indicating a minimum time-to-collision for any object that could be located in an occluded region behind the DPV. Techniques for determining adversarial object costs may be found, for example, in U.S. patent application Ser. No. 16/697,096 entitled "Adverse Prediction Planning" filed on Nov. 26, 2019, the entire contents of which are hereby incorporated by reference herein for all purposes. Further, techniques for determining occluded collision costs may be found, for example, in U.S. Pat. No. 11,126,180 entitled "Predicting an Occupancy Associated With Occluded Region" filed on Apr. 30, 2019, the entire contents of which are hereby incorporated by reference herein for all purposes.

Additionally or alternatively, the cost management component may determine whether the vehicle has the right of way to a specific lane. Determining the which vehicle has the right of way to a lane may ensure the vehicle yields to oncoming vehicle before entering the oncoming land and quickly gets out of the way of any incoming vehicles while ensuring the vehicle returns safely to the initial lane. Techniques for determining which object has the right of way may be found, for example, in U.S. patent application Ser. No. 17/850,348 entitled "Determining Right of Way" filed on Jun. 27, 2022, the entire contents of which are hereby incorporated by reference herein for all purposes. Further, techniques for collision avoidance for vehicles with the right of way may be found, for example, in U.S. patent application Ser. No. 16/856,996 entitled "Collision Avoidance For Vehicles With Right of Way" filed on Apr. 23, 2020, the entire contents of which are hereby incorporated by reference herein for all purposes. In some examples, the cost management component may consider and/or evaluate the right of way when determining which trajectory to follow.

Though the trajectory determination techniques are described by generating multiple trajectories, receiving one or more weighted heatmaps, determining cost(s) for the trajectories based on the weighted heatmaps, and determining or selecting the trajectory with the lowest overall cost, in other examples such the cost management component may determine an initial trajectory, determine costs values for the initial trajectory based on weighted heatmaps, and generate an optimized trajectory for the vehicle to follow based on the cost values.

As illustrated by these examples, the techniques described herein can improve systems and processes of the autonomous and semi-autonomous vehicles operating in various driving environments. Determining the heatmaps during the pre-computation stage as described herein may improve computational efficiency by reducing the amount of processing for the vehicle to perform in order to determine reduced cost values. The improved computation efficiency can increase computing speeds which may enable the vehicle to determine cost values sooner, thereby enabling the vehicle to determine vehicle trajectories sooner.

The techniques described herein can be implemented in a number of ways. Example implementations are provided below with reference to the following figures. Example implementations are discussed below in which the vehicles are implemented as autonomous vehicles. However, the methods, apparatuses, and systems described herein can be applied to fully or partially autonomous vehicles, robots, and/or robotic systems and are not limited to autonomous vehicles. Moreover, at least some of the techniques described herein may be utilized with driver-controlled vehicles. Also, while examples are given with respect to land vehicles (e.g., cars, vans, trucks, or other wheeled or tracked vehicles), the techniques can also be utilized in an aviation or nautical contexts. Additionally, the techniques described herein may be used with real data (e.g., captured using sensor(s)), simulated data (e.g., generated by a simulator), or any combination of the two.

FIG. 1 is a pictorial flow diagram illustrating an example process 100 for determining that a DPV is blocking the vehicle's lane, generating a trajectory around the DPV, determining a cost of the trajectory based on weighted heatmaps, and controlling the vehicle based on the cost values. As shown in this example, some or all of the operations in the example process 100 may be performed by a cost management component 102 integrated within a perception component, a prediction component, a planning component, and/or other components and systems within an autonomous vehicle. For instance, as shown in this example, example process 100 may be implemented using a cost management component 102. As described below in more detail, the cost management component 102 may include various components, such as a DPV identifying component, a cost determining component, a heatmap component, and/or a trajectory determining component which may be configured to identify a DPV, determine costs for trajectories around the DPV, and control the vehicle based on the cost.

At operation 104, the cost management component 102 may determine that an object is double parked in a vehicle's current lane. While a vehicle navigates within an environment, the cost management component 102 may detect or otherwise identify one or more stationary vehicles. The cost management component 102 may identify one or more DPVs based on analyzing the list of stationary objects. In such examples, the cost management component 102 may determine whether such DPV(s) are located within the vehicle's lane. For example, box 106 illustrates an autonomous vehicle 108 navigating an environment and approaching a plurality of detected objects. In this example, the vehicle 108 may be navigating on a two-lane road. The lane to the left of the vehicle 108 may be an oncoming traffic lane 116. As shown, the environment may include a first object 110, a second object 112, and a third object 114. As shown in box 106, the first object 110 may be a vehicle, the second object 112 may be a vehicle, and the third object 114 may be a vehicle. However, in other examples there may be additional or fewer objects. Further, in other examples the objects may be a vehicle, pedestrian, animal, cyclist, or any other dynamic object.

In some examples, the cost management component 102 may identify one or more stationary objects. The cost management component may receive a list of the stationary vehicle(s) from one or more components of the vehicle 108. As shown in box 106, the first object 110, the second object 112, and the third object 114 may each be considered a stationary vehicle. In this example, the second object 112 and the third object 114 may be parked at different positions along opposite sides of the road. Further, the first object 110 may be parked in the same lane as the vehicle 108. As such, the cost management component 102 may determine that the first object 110 is blocking the path of the vehicle 108 and is considered a DPV. Additional details for identifying DPVs are described with respect to FIGS. 2-4.

At operation 118, the cost management component 102 may generate a trajectory (e.g., candidate trajectory) around the object. In some instances, the cost management component 102 or any other component of the vehicle 108 may determine one or more candidate trajectories that lead the vehicle 108 around the DPV and/or to a location behind the DPV. For example, box 120 illustrates a trajectory 122 that leads the vehicle 108 around the first object 110. In this example, the cost management component 102 may generate a trajectory 122 that causes the vehicle 108 to enter the oncoming traffic lane 116 in order to go around the first object 110. Further, after passing the first object 110 in the oncoming traffic lane 116, the trajectory 122 may lead the vehicle 108 back into the first lane. Of course, in other examples the cost management component 102 may receive and/or generate more or less trajectories that lead around the first object 110 and/or to a location behind the object.

At operation 124, the cost management component 102 may determine a cost for the trajectory based on one or more weighted heatmaps. When determining whether to follow the trajectory 122, the cost management component 102 may determine a cost associated with the trajectory 122. In such instances, the cost management component 102 may utilize weighted heatmaps to modify the cost values by increasing or decreasing the cost values of a trajectory 122. For example, box 126 illustrates multiple weighted heatmaps that cover regions of the environment proximate the first object 110. In this example, the box 126 includes a dilated DPV 128 which represents the location and/or pose of the DPV. In some examples, the dilated DPV 128 may be larger than the size and/or dimensions of the first object 110. Of course, in other examples the dilated DPV 128 and the first object 110 may be the same size and/or dimensions. Additional details for dilating DPVs are described with respect to FIG. 2.

As shown in FIG. 1, box 126 includes a first heatmap 130 surrounding the dilated DPV 128 and a second heatmap 132 surrounding and/or adjacent to the first heatmap 130. The first heatmap 130 may include a weight that increases some or all cost values (e.g., progress related costs, policy related costs, comfort related costs, etc.) for the trajectory 122, whereas the second heatmap 132 includes a weight that decreases some or all cost values (e.g., progress related costs, policy related costs, comfort related costs, etc.). As a non-limiting example of which, the first heatmap 130 may cause an increase to a progress cost (thereby penalizing motion in the region to favor motion outside of the region) while the second heatmap 132 may decrease a policy related cost (thereby reducing penalties associated with performing actions such as crossing lane markers, for example). In such an illustrating example, it can be seen that modification of certain costs in the various regions may promote solutions which result in vehicle controls avoiding stopping behind the dilated DPV 128, navigating around the dilated DPV 128, etc.

In some examples, the first and second heatmaps may include one or more weight values per heatmap. For instance, the first and/or second heatmaps may include multiple cells which may include different weight values. Such weight values may be determined based on a function (such as a decay or otherwise with respect to distance from the DPV) so that influence of the DPV on behavior of the vehicle is non-uniform spatially with respect to the DPV. As shown in box 126, the first heatmap 130 may include a width of approximately the width of the first lane; however, in other examples the width of the first heatmap 130 may be larger or smaller. The second heatmap 132 may include a width that spans between approximately three lanes (e.g., the current lane and the lanes the left and right of the current lane). However, in other examples the second heatmap 132 may have differing widths based on the environment. For instance, the vehicle 108 may determine that there is not a lane to the right as it is street side parking. As such, the vehicle 108 may determine that the second heatmap 132 has a width that spans the current lane and the oncoming traffic lane 116 while not covering the street side parking.

In some examples, the cost management component 102 may utilize the first and second heatmaps to determine a cost for the trajectory 122. For example, the cost management component may determine that the trajectory passes through the first and/or second heatmaps. Based on the trajectory passing through the heatmap(s), the cost management component may modify (e.g., multiply) the cost value with the weight data within the heatmap. Alternatively or additionally, the cost management 102 component may modify one or more cost values based on determining that an end of the trajectory is located within the first or second heatmap. An end of the trajectory may be determined based on trajectory information and/or state data of the trajectory. In such instances, the cost management component 102 may combine the various costs into a single overall cost. Such costs may be weighted differently, and as such, different costs may affect the overall cost in different proportions. Additional details for utilizing the weighted heatmaps to determine costs are described with respect to FIGS. 2-4.

At operation 134, the cost management component 102 may control the vehicle 108 to follow the trajectory 122 based on the cost. The cost management component 102 may associate the overall cost with the trajectory and, in order to determine which trajectory to follow, input such trajectories and/or costs into a tree search. For example, box 136 illustrates the vehicle 108 following the trajectory 122 around the first object 110. Specifically, the cost management component may determine that the trajectory 122 has the lowest overall cost, and as such, may determine to follow the trajectory 122 into the oncoming traffic lane 116 to go around the first object 110.

Figure 2:
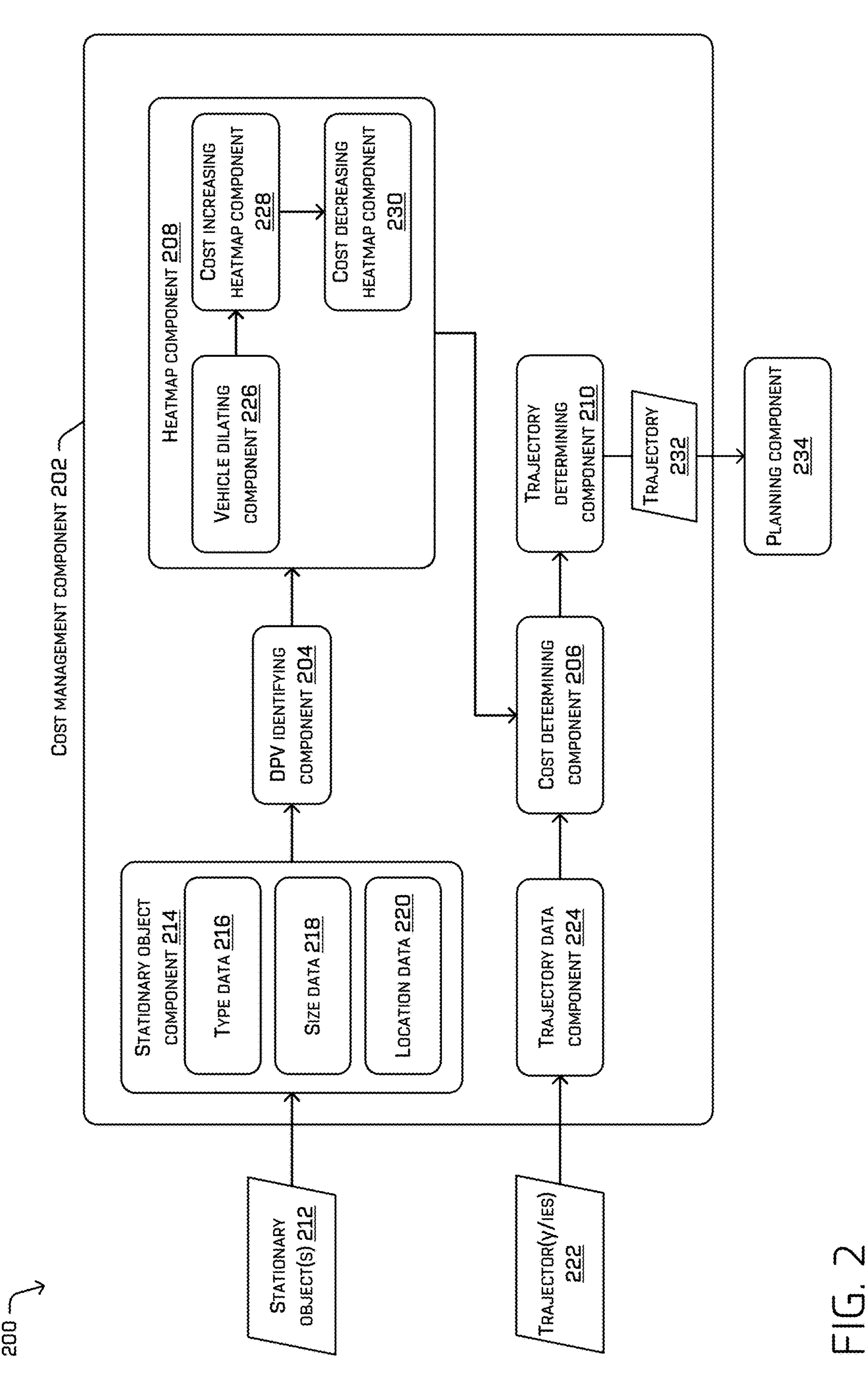
FIG. 2 illustrates an example computing system including a cost management component configured to enable a vehicle to go around a DPV, in accordance with one or more examples of the disclosure.

FIG. 2 illustrates an example computing system 200 including a cost management component configured to enable a vehicle to go around a DPV.

In some examples, the cost management component 202 may be similar or identical to the cost management component 102 described above, or in any other examples herein. As noted above, in some cases the cost management component 202 may be implemented within or otherwise associated with a perception component, a prediction component, and/or a planning component of an autonomous vehicle. In some examples, the cost management component 202 may include various components, described below, configured to perform different functionalities of a trajectory determining technique. In some examples, some or all of the subcomponents of the cost management component 202 may be integrated in a remote server-based system while other subcomponents may be integrated in on-vehicle systems. In some examples, the cost management component 202 may include a DPV identifying component 204 configured to identify DPV(s) from a list of stationary object(s), a cost determining component 206 configured to determine the cost of candidate trajectories, a heatmap component 208 configured to determine one or more weighted heatmaps, and/or a trajectory determining component 210 configured to select or otherwise determine a candidate trajectory to follow.

In some examples, the cost management component 202 may receive a list of stationary objects 212 from one or more components of the autonomous vehicle. In some examples, the stationary objects 212 may be identified by one or more of a perception system, a prediction system, or a planning system. The stationary objects 212 may be an object that has a velocity below a threshold value (which may be for a threshold period of time), an object that has a stationary intent as described above, and/or is otherwise detected to be a blocking object. As shown in this example, the stationary object component 214 may receive the stationary objects 212. The stationary object component 214 may be configured to receive, store, synchronize, and/or analyze the stationary objects 212 received from one or more components of the vehicle.

In this example, the stationary object component 214 may include one or more components associated with different features of the stationary objects 212. As illustrated in FIG. 2, the stationary object component 214 may include features of the stationary object such as type data component 216, size data component 218, and/or location data component 220. Of course, in other examples the stationary objects 212 may include more or less features. In this example, the type data component 216 may be used to determine, store, and/or synchronize a type and/or characterization of the stationary object 212. The size data component 218 may be used to receive, store, and/or synchronize the size and/or dimensions of the stationary object 212. The location data component 220 may be used to receive, store, and/or synchronize the location and/or pose of the stationary object(s) 212. In some examples, the stationary object component 214 may send stationary object 212 data to the DPV identifying component 204 for further analysis.

In some examples, the cost management component 202 may receive a trajectory 222 for the autonomous vehicle to follow. In some examples, the trajectory 222 may be generated by one or more of a perception system, a prediction system, or a planning system. Such systems may transmit the trajectory 222 to the cost management component 202. In some examples, the trajectory 222 may be a trajectory that leads the vehicle to a position behind the stationary object (e.g., DPV), or into an oncoming lane of traffic to go around the stationary object. In such instances, the cost management component 202 may receive one or more of each type of trajectory. As shown in this example, the trajectory data component 224 may receive the trajectory 222 (or trajectories). The trajectory data component 224 may be configured to receive, store, synchronize, and/or analyze the trajectories 222 received from one or more components of the vehicle.

In some examples, the cost management component 202 may include a DPV identifying component 204 configured to identify DPV(s) from a list of stationary object(s). In some examples the DPV identifying component 204 may receive trajectories 222 from the trajectory data component 224 and/or stationary object 212 data from the stationary object component 214. In some instances, the DPV identifying component 204 may utilize such information to determine, identify, and/or classify stationary objects as DPVs. In such instances, the DPV identifying component 204 may determine whether and/or to what degree the stationary vehicle(s) are located within a lane adjacent to the side of the road. For instance, a stationary object may be considered a DPV if more than a threshold amount or percentage of the lane is covered by the stationary object. Further the DPV identifying component 204 may determine whether such DPVs are relevant to the vehicle. For example, the DPV identifying component 204 may determine whether such DPVs are located within the same lane as the vehicle. DPVs that are not located in the same lane as the vehicle may be considered irrelevant to the vehicle. The DPV identifying component 204 may send a list of one or more DPVs to the heatmap component 208 and/or the cost determining component 206.

In some examples, the cost management component 202 may include a cost determining component 206 configured to determine the cost of candidate trajectories. In some examples, the cost determining component 206 may receive a list of DPV(s) from the DPV identifying component 204 and/or associated heatmaps. Further, the cost determining component 206 may receive the trajectories 222 from the trajectory data component 224. In such instances, the cost determining component 206 may utilize such DPV information to receive, retrieve, and/or request weighted heatmaps from the heatmap component 208. Such weighted heatmaps may be used to determine the cost of the trajectories 222.

In some examples, the cost determining component may determine whether the trajectory 222 passes through either the first or second heatmaps. If the trajectory 222 passes through one or both heatmaps, the cost determining component 206 may modify the cost based on the weight value associated with the heatmap. Additional disclosure describing determining cost using heatmaps may be discussed in FIGS. 3-6.

In some examples, the cost management component 202 may include a heatmap component 208 configured to determine one or more weighted heatmaps. In some examples, the heatmap component 208 may include one or more components configured to generate one or more heatmaps. The heatmap component 208 may include a vehicle dilating component 226, a cost increasing heatmap component 228, and/or a cost decreasing heatmap component 230.

In some examples, the vehicle dilating component 226 may be configured to determine dilated DPVs. In some instances, the vehicle dilating component 226 may determine a type and/or predicted size of the DPV and utilize such information to determine the degree to which the DPV is to be dilated. The degree to which the DPV is dilated may be based on a type of DPV, predicted acceleration capabilities of the DPV (e.g., increase the dilation size based on the DPV having high acceleration capabilities; decrease the dilation size based on the DPV having low acceleration capabilities), a distance between the vehicle and the DPV (e.g., larger distance may increase DPV uncertainty and as such increase dilation size), a velocity of the vehicle, a confidence level the DPV will remain stationary, and/or any other factor. In some examples, a confidence level the DPV will remain stationary may be based on one or more machine-learning models and/or one or more heuristic based techniques. Further, such a confidence level may be based on velocity of the stationary vehicle, location, pose, vehicle lighting, and/or any other factor.

In some examples, the cost increasing heatmap component 228 may be configured to generate a heatmap surrounding the DPV that has a weight that increases at least one of the cost values. Further, the cost decreasing heatmap component 230 may be configured to generate a heatmap surrounding the first heatmap (e.g., generated by the cost increasing heatmap component 228) that has a weight that decreases at least one of the cost values. In some examples, the size and/or dimensions of the first and/or second heatmaps may be based on a variety of factors, such as a dilated DPV, a size (or dilated size) of the DPV (e.g., increase heatmap(s) length for larger DPV; semantic information about the environment, weather, time of day, time of year; decrease heatmap(s) length for smaller DPV), an orientation of the DPV, a velocity of the vehicle (e.g., increase the heatmap(s) length according to increased velocity), a distance between the vehicle and the DPV, a type of vehicle, a difference in velocity between the vehicle and the DPV, a pose of the vehicle, and/or any other factor. The heatmap component 208 may access map data to determine one or more of the above-mentioned factors. In some examples, the heatmap component 208 may send dilated DPV boxes, cost increasing heatmaps, and/or cost decreasing heatmaps.

In some examples, the cost management component 202 may include a trajectory determining component 210 configured to select or otherwise determine a candidate trajectory to follow. The trajectory determining component 210 may receive the overall cost(s) from the cost determining component 206 and associate the respective trajectories. The trajectory determining component 210 may input the costs and/or trajectories into a tree search. Based on the tree search (which may include other costs, including but not limited to one or more of an obstacle cost, a reference cost, a steering cost, an acceleration cost, and the like), the trajectory determining component 210 may determine a trajectory 232 for the vehicle to follow. In such instances, the trajectory determining component 210 may send the trajectory 232 to a planning component 234. In such instances, the planning component 234 may utilize the trajectory 232 by causing the vehicle to follow the trajectory 232 around the DPV.

Figure 3:
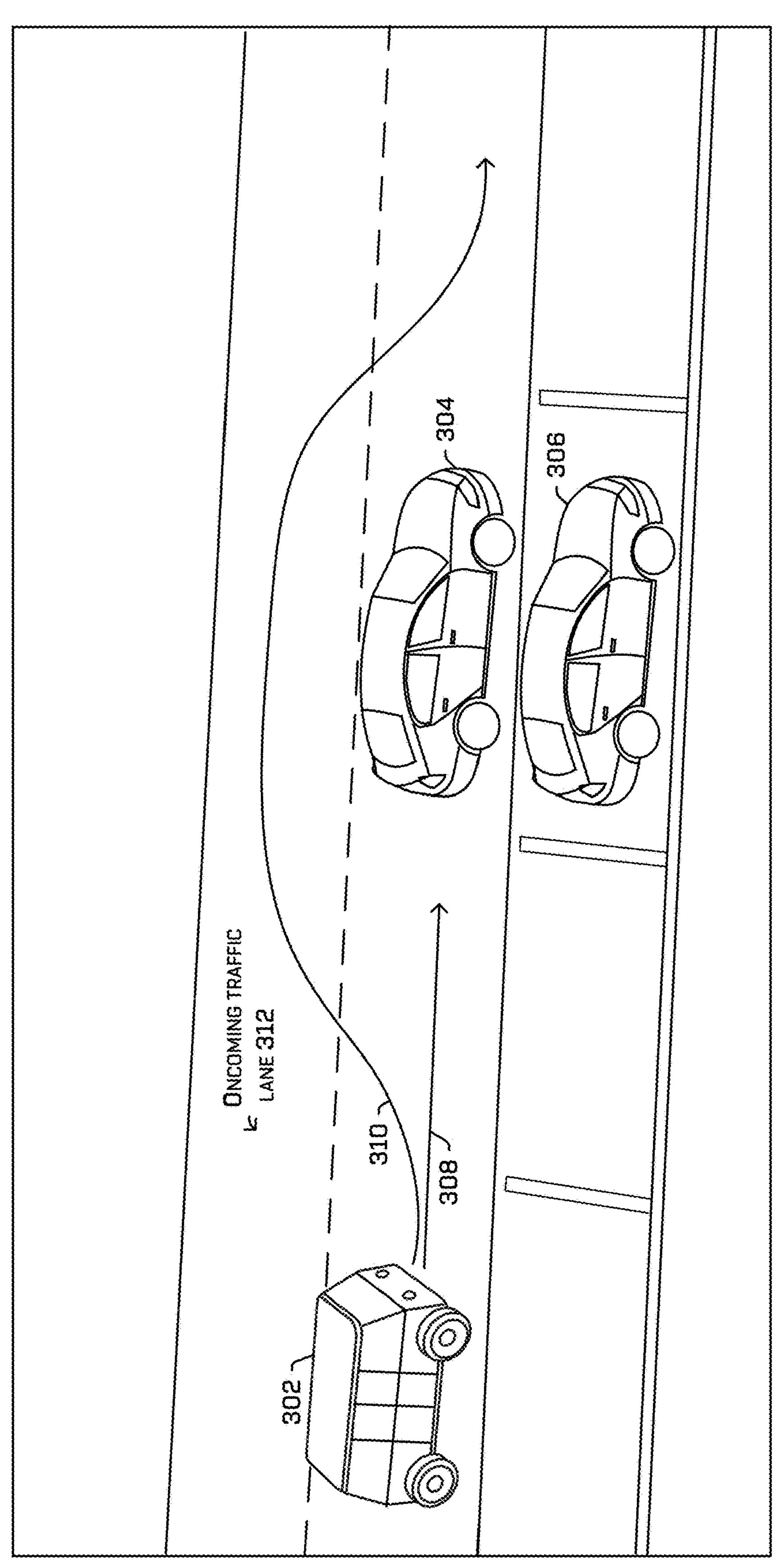
FIG. 3 depicts an example environment including a vehicle with multiple candidate trajectories approaching a DPV, in accordance with one or more examples of the disclosure.

FIG. 3 depicts an example environment 300 including a vehicle with multiple candidate trajectories approaching a DPV.

In this example, the example environment 300 may be similar or identical to the environment illustrated and/or described in FIGS. 1 and 2. As shown, the example environment 300 may include a vehicle 302. The vehicle 302 may be navigating along a road and approaching multiple objects. In this example, the example environment 300 may include a first object 304 and a second object 306 which are stationary. As shown, the first and second objects may be vehicles; however, in other examples the first and/or second vehicles may be any other type of object. In this example, the second object 306 may be parked in a parking space along the side of the road. Further, the first object 304 may be double parked laterally adjacent to the second object 306. As such, the first object 304 may be a double-parked vehicle blocking the lane and/or path of the vehicle 302.

In some examples, the vehicle 302 may generate one or more trajectories based on the first object 304 (e.g., DPV). As shown, the vehicle 302 may include a first trajectory 308 that leads the vehicle 302 to a location behind the first object 304. In such instances, the first trajectory 308 would cause the vehicle 302 to stop and wait for the first object 304 to resume movement. Additionally, the vehicle 302 may include a second trajectory 310 that leads the vehicle 302 into an oncoming traffic lane 312 and around the first object 304. In such instances, the vehicle 302 may determine a first cost of the first trajectory 308 and a second cost of the second trajectory 310. The vehicle 302 may follow the trajectory with the lowest overall cost.

Figure 4:
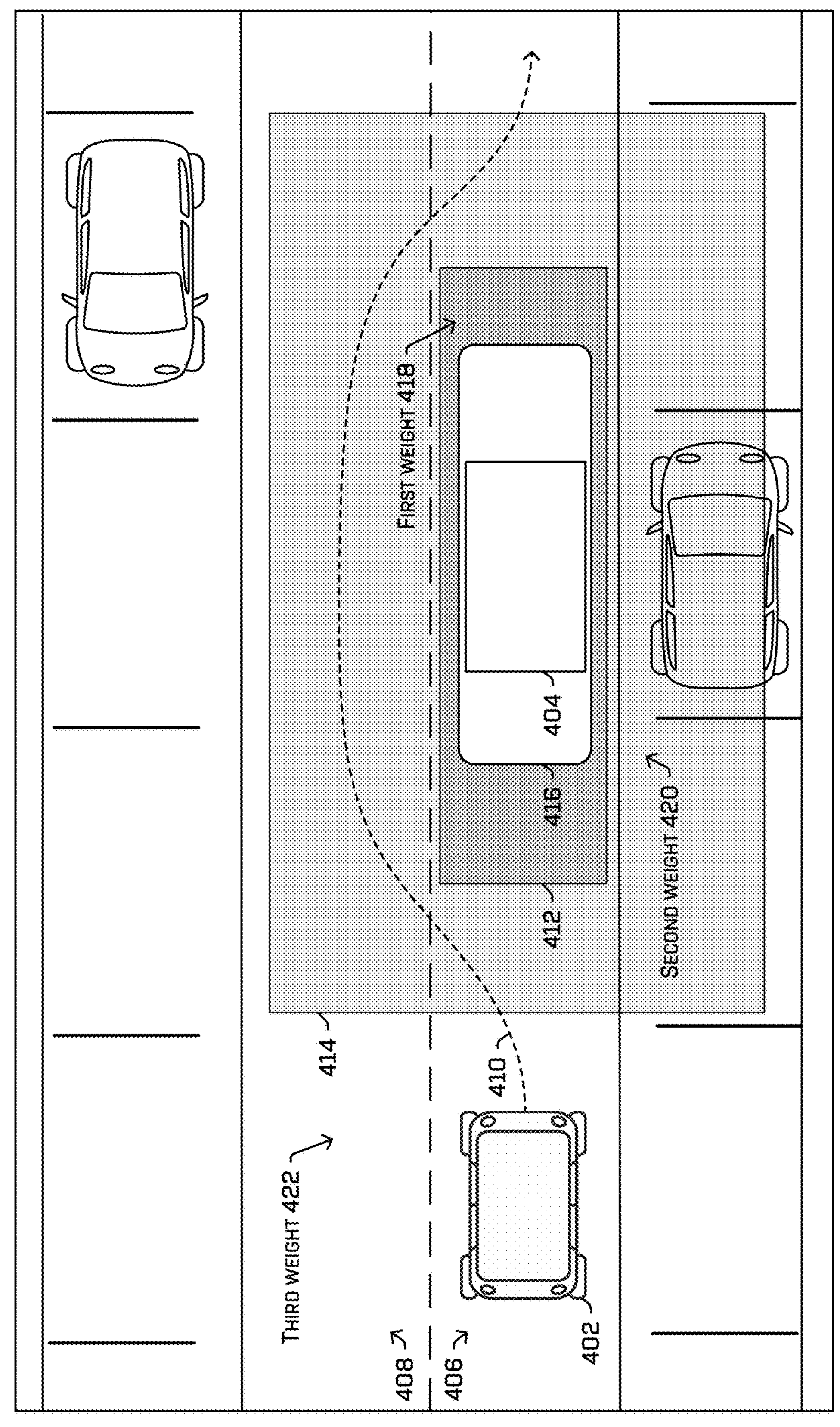
FIG. 4 depicts an example environment in including multiple weighted heatmaps proximate a DPV, in accordance with one or more examples of the disclosure.

FIG. 4 depicts an example environment 400 in including multiple weighted heatmaps proximate a DPV.

In this example, the example environment 400 may be similar or identical to the environment illustrated and/or described in FIGS. 1 and 2. As shown, the example environment 400 may include a vehicle 402 navigating along a road and approaching a DPV. As shown, the example environment 400 may include a box 404 which represents the location, extent, and/or dimensions of the DPV. In this situation, the vehicle 402 may be traveling in a first lane 406 while the adjacent lane is an oncoming traffic lane 408.

As shown in FIG. 4, based on identifying a DPV blocking the vehicle's path in the first lane 406, the vehicle 402 may generate a trajectory 410 that enters the oncoming traffic lane 408 and goes around the DPV and returns to the first lane 406. Though a single trajectory is shown, in other examples more or less trajectories may be generated. Further, such trajectories may lead the vehicle 402 around and/or behind the DPV.

In some examples, the vehicle 402 may determine whether to follow the trajectory 410 based on determining an overall cost for the trajectory 410. As described above, the vehicle 402 may determine multiple different cost values associated with the trajectory 410. In such instances, the vehicle 402 may utilize one or more weighted heatmaps to increase or decrease such cost values. For example, the example environment 400 may include a first heatmap 412 which has a first weight 418 that increases at least one of the cost values. The example environment 400 may also include a second heatmap 414 which has a second weight 420 that decreases at least one of the cost values. In some instances, the region outside of the first or second heatmaps may include a third weight 422 that limits an increase or decrease to at least one of the cost values. As a non-limiting example of which, the second weight 420 may be associated with a policy cost while the third weight 422 prevents such weighting from meeting or exceeding some threshold value.

In some examples, the size and/or shape of the first and/or second heatmaps may be based on a variety of factors as described above in FIGS. 1 and 2. In some examples, the first and/or second heatmaps may be symmetric or asymmetric longitudinally and/or laterally. Of course, though illustrated as rectangular in the figures, the disclosure is not to be so limiting. Indeed, the shape of the first and second heatmaps may differ from one another, be various other shapes, sizes, and/or locations relative to the DPV and the representations herein are meant to be illustrative only. In this example, one such factor may include the dilation of the DPV. As shown, the example environment 400 may include a dilated DPV 416 which has an increased width and/or length compared to the box 404 which represents the extent of the DPV. Though the dilated DPV 416 is shown to be offset within the first heatmap 412, in other examples the dilated DPV 416 may be positioned in the center of the first heatmap 412. In other examples, the edge of the dilated DPV closest to the vehicle 402 may be flush with the back of the box 404. Further, in other examples the first heatmap 412 may be positioned at any location within the second heatmap 414.

In some examples, the vehicle 402 may use the heatmap(s) to modify cost values associated with the trajectory 410. For example, when the vehicle 402 determines a cost value, the vehicle 402 may determine that the trajectory 410 enters the second heatmap 414. In such instances, the vehicle 402 may modify the cost value based on the second weight 420 associated with the second heatmap 414 which, in this case may decrease the cost value. As such, the overall cost of the trajectory 410 may be smaller based on the trajectory 410 passing through the second heatmap 414.

Figure 5:
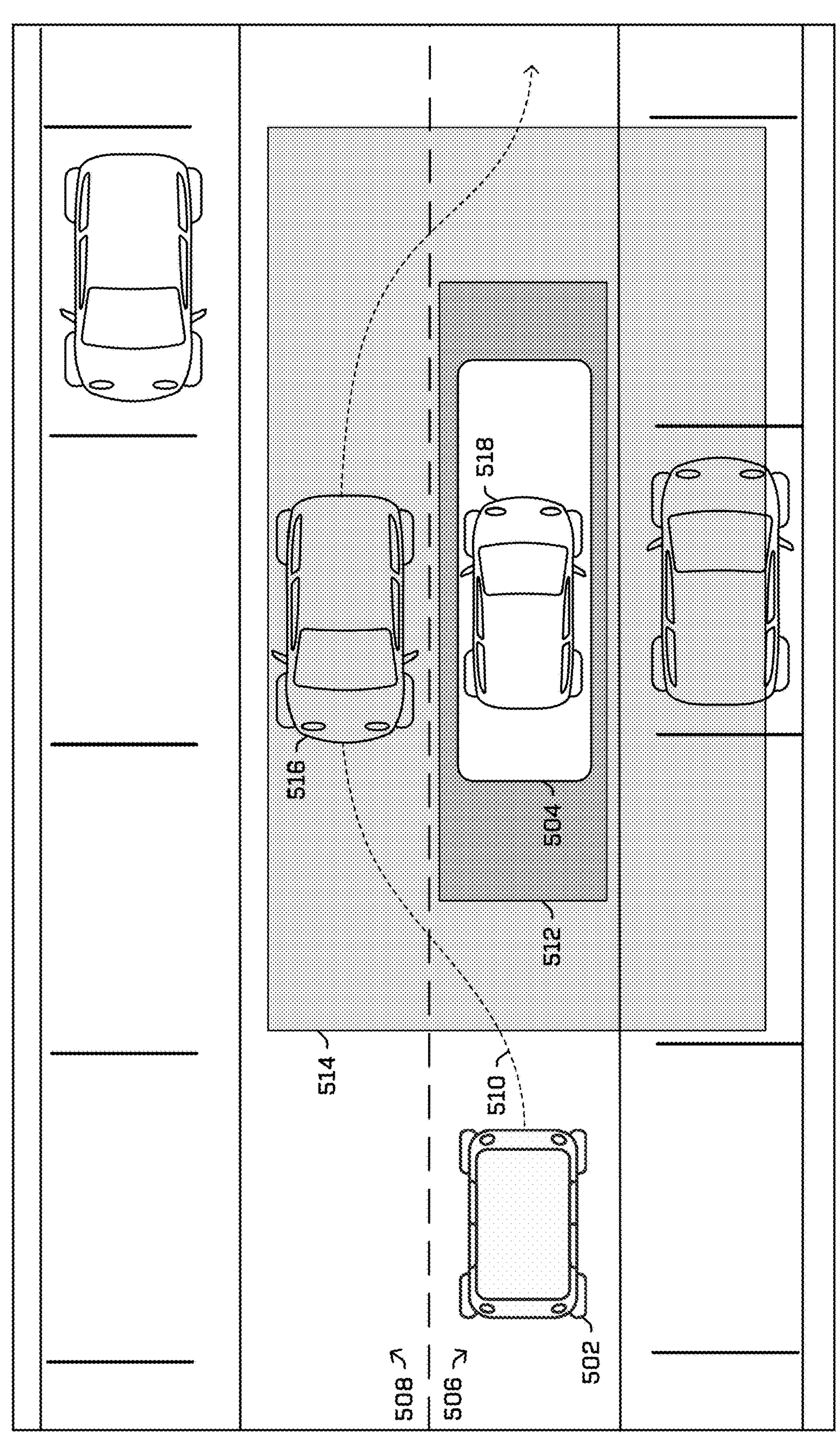
FIG. 5 depicts an example environment in which a vehicle is approaching in an oncoming traffic lane, in accordance with one or more examples of the disclosure.

FIG. 5 depicts an example environment 500 in which a vehicle is approaching in an oncoming traffic lane. Specifically, FIG. 5 illustrates that there may be cost types which are unaffected by the weighted heatmaps.

In this example, the example environment 500 may include a vehicle 502 that is navigating along a road and approaching a DPV. As shown, the example environment 500 may include an object 518 which may be identified as a DPV. In such instances, the example environment 500 may include a dilated DPV 504 which represents the location and/or pose of the object 518. In this situation, the vehicle 402 may be traveling in a first lane 506 while the adjacent lane is an oncoming traffic lane 508.

As shown in FIG. 5, based on identifying the object 518 blocking the vehicle's 502 path in the first lane 506, the vehicle 502 may generate a trajectory 510 that enters the oncoming traffic lane 508 and goes around the object 518 and back into the first lane 506. Though a single trajectory is shown, in other examples more or less trajectories may be generated. Further, such trajectories may lead the vehicle 502 around and/or behind the object 518.

In some examples, the vehicle 502 may determine whether to follow the trajectory 510 based on determining an overall cost for the trajectory 510. As described above, the vehicle 502 may determine multiple different cost values associated with the trajectory 510. In such instances, the vehicle 502 may utilize one or more weighted heatmaps to increase or decrease at least one of the cost values (e.g., progress related costs, policy related costs, comfort related costs, legality related costs, etc.). For example, the example environment 500 may include a first heatmap 512 which has a weight value that increases some or all cost values. The example environment 500 may also include a second heatmap 514 which has a weight value that decreases cost values.

In some examples, the vehicle 502 may determine cost values which are not affected by the first or second heatmaps. For instance, the vehicle 502 may determine an adversarial vehicle cost indicating the degree of uncertainty associated with oncoming vehicle trajectories and/or an occluded collision cost indicating a minimum time-to-collision for any object that could be located in an occluded region behind the DPV. As shown in FIG. 5, the example environment 500 may include an oncoming vehicle 516 which intersects with the trajectory 510 of the vehicle 502. In such instances, the vehicle 502 may determine that there is a high adversarial vehicle cost based on the oncoming vehicle 516. Despite the trajectory 510 passing through the second heatmap 514, the vehicle 502 may determine that the adversarial vehicle cost is maintained and not modified. As such, the vehicle 502 may determine that the overall cost of the trajectory 510 is too high and may remain in the first lane 506.

Figure 6:
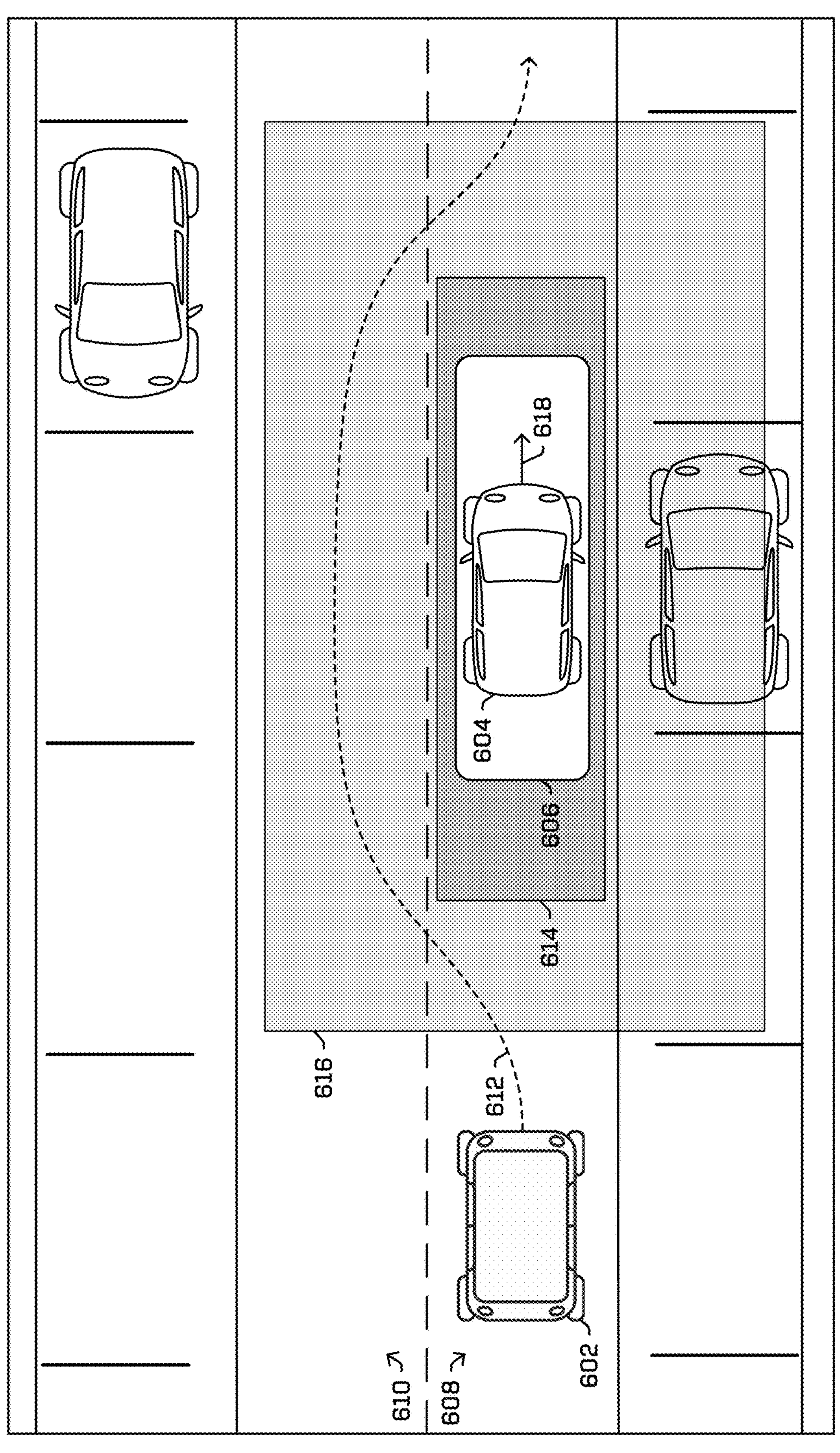
FIG. 6 depicts an example environment in which multiple weighted heatmaps are proximate a moving vehicle, in accordance with one or more examples of the disclosure.

FIG. 6 depicts an example environment 600 in which multiple weighted heatmaps are proximate a moving vehicle. Specifically, FIG. 6 illustrates that a vehicle may utilize weighted heatmaps with objects that are not parked but have a velocity below a threshold value.

In this example, the example environment 600 may include a vehicle 602. The vehicle 602 may be navigating along a road and approaching an object 604. As shown, the object 604 may be a vehicle; however, in other examples the object 604 may be a cyclist, cart, pedestrian, animal, and/or any other dynamic object. The object 604 may be following a trajectory 618. In this example, the vehicle 602 may identify and/or classify the object 604 as a DPV based on the object 604 having a velocity that is below a threshold level. In such instances, the vehicle 602 may determine a dilated box 606 corresponding to the object 604. The size and/or dimensions of the dilated box 606 may be determined based on the velocity of the object 604 (e.g., increase size of dilated box 606 with the higher velocity; decrease size of dilated box 606 with lower velocity), an orientation of the object 604, and/or any other factor.

As shown in FIG. 6, based on identifying the object 604 blocking and/or impeding the vehicle's path in the first lane 608, the vehicle 602 may generate a trajectory 612 that enters the oncoming traffic lane 610 and goes around the object 604 and back into the first lane 608. Though a single trajectory is shown, in other examples more or less trajectories may be generated. Further, such trajectories may lead the vehicle 602 around and/or behind the object 604.

The vehicle 602 may determine whether to follow the trajectory 612 based on determining an overall cost for the trajectory 612. As described above, the vehicle 602 may utilize one or more weighted heatmaps to increase or decrease such cost values. For example, the example environment 600 may include a first heatmap 614 which has a weight value that increases some or all cost values. The example environment 600 may also include a second heatmap 616 which has a weight value that decreases cost values.

In some examples, based on the moving nature of the object 604, the vehicle 602 may utilize weighted heatmaps that are larger to account of the movement of the object 604, or the vehicle 602 may cause the dilated box 606, the first heatmap 614, and/or the second heatmap 616 to move with the object 604. In such instances, the vehicle 602 may determine the velocity of the object 604, and the vehicle 602 may cause the dilated box 606, the first heatmap 614, and/or the second heatmap 616 to move at a similar or identical velocity such that the object 604 remains at the center of the dilated box 606 while traversing the environment 600.

Figure 7:
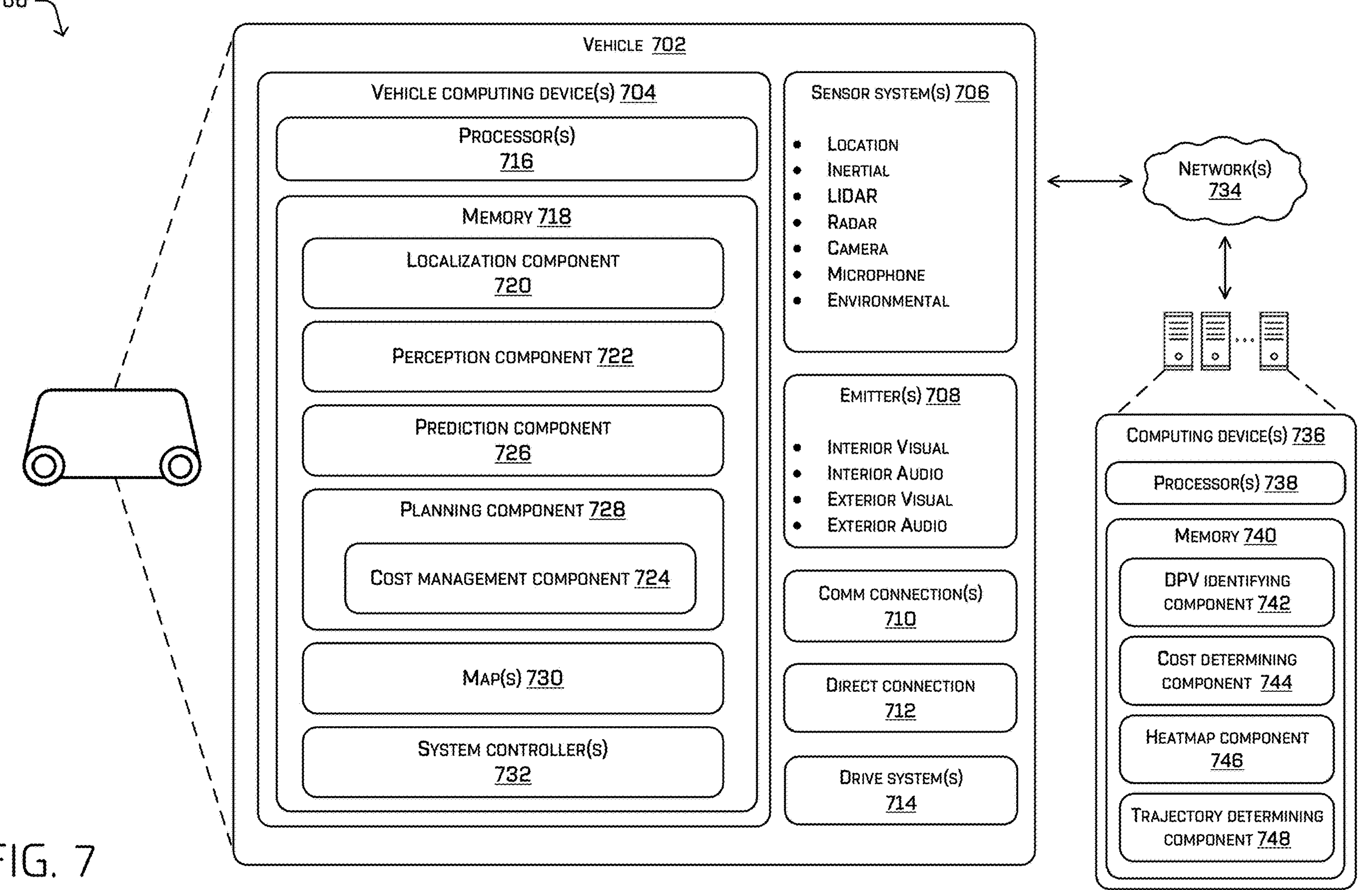
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722, a prediction component 726, a planner component 728 including a cost management component 724, one or more system controllers 732, and one or more maps 730 (or map data). Though depicted in FIG. 10 as residing in the memory 718 for illustrative purposes, it is contemplated that the localization component 720, the perception component 722, the prediction component 726, the planner component 728, the cost management component 724, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736 (e.g., a remote computing device)). In some examples, the memory 740 may include a DPV identifying component 742, a cost determining component 744, a heatmap component 746, and a trajectory determining component 748.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

The cost management component 724 may be perform any of the techniques described with respect to any of FIGS. 1-6 above with respect to utilizing weighted heatmaps to decrease cost values of a trajectory which may enable a vehicle to enter an oncoming traffic lane to go around a double-parked vehicle ("DPV").

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 May include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the cost management component 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the cost management component 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include a DPV identifying component 742, a cost determining component 744, a heatmap component 746, and a trajectory determining component 748. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the DPV identifying component 742, the cost determining component 744, the heatmap component 746, and the trajectory determining component 748 may perform substantially similar functions as the cost management component 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 8:
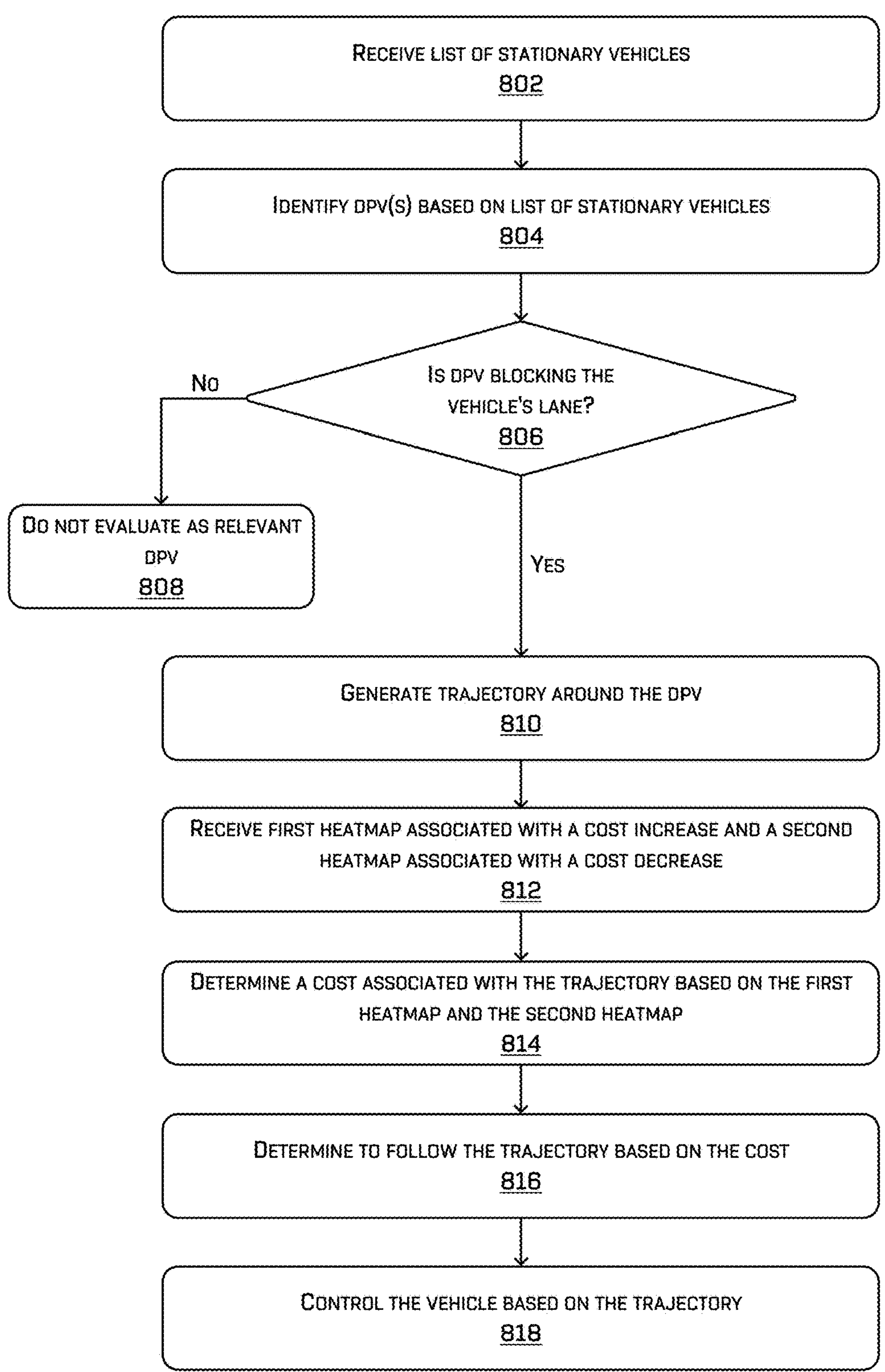
FIG. 8 is a flow diagram illustrating an example process of identifying a DPV blocking a vehicle's lane, generating a trajectory around the DPV, determining a cost of the trajectory based at least in part on weighted heatmaps, and controlling the vehicle based on the cost, in accordance with one or more examples of the disclosure.

FIG. 8 is a flow diagram illustrating an example process 800 of identifying a DPV blocking a vehicle's lane, generating a trajectory around the DPV, determining a cost of the trajectory based at least in part on weighted heatmaps, and controlling the vehicle based on the cost. As described below, the example process 800 may be performed by one or more computer-based components configured to implement various functionalities described herein. For instance, process 800 may be performed by a cost management component 202. As described above, the cost management component 202 may be integrated as an on-vehicle system in some examples. However, in other examples, the cost management component 202 may be integrated as a separate server-based system.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the cost management component may receive a list of stationary vehicles. For instance, the cost management component may receive a list of one or more stationary vehicles from a prediction component, perception component, planning component, and/or any other component of the vehicle. In such instances, such components may receive sensor data from one or more sensors of the autonomous vehicle traversing within the environment. In some instances, the vehicle may include one or more sensor devices located and/or mounted at various locations and/or angles on the vehicle. In some cases, such sensor devices may include lidar devices, radar devices, image capturing devices, time-of-flight devices, infrared devices, and/or any other type of sensor device. In such instances, the component may analyze such sensor data to detect an object within the environment. Further, the component(s) may determine that the object is a stationary object based at least in part on determining a stationary intent (e.g., the object is predicted to remain stationary). In such instances, the component(s) may send a list of stationary object(s) to the cost management component.

At operation 804, the cost management component may identify one or more DPVs based on the list of stationary vehicles. A DPV may be a parked (e.g., velocity below a threshold value) vehicle laterally adjacent to an already parked vehicle along the side of a road. Additionally or alternatively, a DPV may be a parked vehicle proximate the side of a road without a laterally adjacent parked vehicle. As such, the cost management component may determine whether and/or to what degree the stationary vehicle(s) are in located within a lane adjacent to the side of the road. For instance, a stationary object may be considered a DPV if more than a threshold amount or percentage of the lane is covered, or if the stationary vehicle causes the vehicle to enter more than a threshold amount into the lane to the left or right of the stationary vehicle. The cost management component may evaluate some or all of the stationary vehicle(s) to determine on or more DPVs.

At operation 806, the cost management component may determine whether the DPV is blocking the vehicle's lane. In some examples, the cost management component may determine whether the identified DPVs are located within the same lane as the vehicle. As such, the cost management component may determine to what degree the stationary vehicle is impinging the on the vehicle's lane. In such instances, if the stationary vehicle is covering over a threshold amount of the vehicle's lane, the vehicle may determine that such a stationary vehicle is a DPV. If the DPV is not blocking the vehicle's lane (806: No), the cost management component may not evaluate the DPV as a relevant DPV. At operation 808, the cost management component may filter out some or all DPVs that are not relevant to the vehicle. A relevant DPV may be a DPV that is located within the vehicle's current lane.

In contrast, if the DPV is blocking the vehicle's lane (806: Yes), the cost management component may generate a trajectory around the DPV. At operation 810, the cost management component may generate a trajectory around the DPV. In some instances, the planner component of the vehicle may determine trajectories that lead the vehicle around the DPV and/or lead the vehicle to a location behind the DPV. The planner component may determine the trajectories based on map data and the desired destination of the vehicle, as well as the classifications, positions, and predicted trajectories of the other objects in the environment. Examples of various techniques for generating planner trajectories for autonomous vehicles can be found, for example, in U.S. Pat. No. 10,921,811, filed on Jan. 22, 2018, issued on Feb. 16, 2021, and titled, "Adaptive Autonomous Vehicle Planner Logic," and U.S. Pat. No. 10,955,851, filed on Feb. 14, 2018, issued on Mar. 23, 2021, and titled, "Detecting Blocking Objects," each of which is incorporated by reference herein in its entirety.

At operation 812, the cost management component may receive a first heatmap surrounding the DPV and associated with a cost increase, and a second heatmap adjacent to the first heatmap and associated with a cost decrease. The first heatmap may cover a region of the environment that surrounds and/or is proximate to the DPV. The second heatmap may cover a region of the environment that surrounds and/or is adjacent to the first heatmap. In some examples, the size and/or dimensions of the first and/or second heatmaps may be based on a variety of factors, such as a dilated DPV, a size (or dilated size) of the DPV (e.g., increase heatmap(s) length for larger DPV; decrease heatmap(s) length for smaller DPV), an orientation of the DPV, a velocity of the vehicle (e.g., increase the heatmap(s) length according to increased velocity), a distance between the vehicle and the DPV, a type of vehicle, a difference in velocity between the vehicle and the DPV, a pose of the vehicle, and/or any other factor.

In some examples, the cost management component may determine a dilated DPV. As it may be difficult for a vehicle to know the absolute length of the DPV, and as the DPV may resume movement at any time, the vehicle may determine a dilated DPV such that the size and/or shape of the DPV provides a buffer to account for uncertainties. In some instances, the vehicle may determine a type and/or predicted size of the DPV and utilize such information to determine the degree to which the DPV is to be dilated. The degree to which the DPV is dilated may be based on a type of DPV, predicted acceleration capabilities of the DPV (e.g., increase the dilation size based on the DPV having high acceleration capabilities; decrease the dilation size based on the DPV having low acceleration capabilities), a distance between the vehicle and the DPV (e.g., larger distance may increase DPV uncertainty and as such increase dilation size), a velocity of the vehicle, a confidence level the DPV will remain stationary, and/or any other factor.

In some examples, the first and/or second heatmaps may include different weight values. For instance, the cost management component may assign a weight value to the first heatmap that, when combined with a cost value, changes the cost value to a higher value. Further the cost management component may assign a weight value to the second heatmap that, when combined with a cost value, changes the cost value to a lower value. In some examples, the first and/or second heatmaps may include one or more weights. For example, the first and/or second heatmaps may include a single weight for the entirety of the heatmap. Alternatively, the first and/or second heatmaps may be discretized into one or more cells such that some or all cells have varying weight values.

At operation 814, the cost management component may determine a cost associated with the trajectory based on the first heatmap and the second heatmap. A cost value can indicate the safety, risk, convenience, and/or efficiency of a trajectory. In some examples, sub-costs may include comfort related costs (e.g., acceleration cost, jerk cost, steering cost, path reference cost, etc.), legality related costs, safety related costs, progress costs, debris cost, an exit cost, an approach cost, a space cost, a payment cost, a yaw cost, and/or any other type of cost. In such instances, the cost management component may combine the various costs into a single overall cost. Such costs may be weighted differently, and as such, different costs may affect the overall cost in different proportions.

In some examples, the cost management component may modify some or all sub-costs based on the weigh values of the first and/or second heatmaps. For example, the cost management component may determine that the trajectory passes through the first and/or second heatmaps. Based on the trajectory passing through the heatmap(s), the cost management component may modify (e.g., multiply) the cost value with the weight data within the heatmap.

At operation 816, the cost management component may determine to follow the trajectory based on the cost. In some examples, the cost management component may select or otherwise determine a trajectory to follow based on a sum of one or more costs. In such instances, the cost management component may select the trajectory with the lowest overall cost. The cost management component may determine which trajectory to follow based on inputting some or all of the sub-costs into a tree search. In such a tree search, trajectories may be selected and/or optimized based on associated costs, including all costs to arrive at a node along the tree (e.g., cost-to-come) and a cost to arrive at a final destination from the node (e.g., cost-to-go). Techniques for generating a trajectory based at least in part on a tree search may be found, for example, in U.S. patent application Ser. No. 18/072,015 entitled "Vehicle Trajectory Tree Search for Off-Route Driving Maneuvers" filed on Nov. 30, 2022, the entire contents of which are hereby incorporated by reference herein for all purposes.

At operation 818, the cost management component may control the vehicle based on the trajectory. Upon identifying the trajectory with the lowest overall cost, the vehicle may follow the trajectory. For example, if the trajectory that goes around the DPV has the lowest overall cost, the vehicle may be caused to follow the trajectory into the oncoming lane of traffic and around the DPV. Alternatively, if the trajectory that waits behind the DPV has the lowest overall cost, the vehicle may be caused to follow the trajectory to a location behind the DPV and wait until the DPV resumes movement.

EXAMPLE CLAUSES

A: A system comprising: one or more processors; and one or more non-transitory computer-readable media storing computer-executable instructions that, when executed, cause the one or more processors to perform operations comprising: receiving, from a sensor device associated with an autonomous vehicle, sensor data from an environment; determining that the autonomous vehicle is traveling in a first lane; determining, based at least in part on the sensor data, an object proximate the autonomous vehicle is a double-parked vehicle; determining a first region surrounding the object; determining a second region adjacent the first region; generating, based at least in part on the first region and the second region, a trajectory associated with the autonomous vehicle; and controlling the autonomous vehicle based at least in part on the trajectory, wherein a first cost associated with the trajectory is increased based at least in part on the trajectory passing through the first region, and a second cost associated with the trajectory is decreased based at least in part on the trajectory passing through the second region.

B: The system of paragraph A, wherein the first cost is associated with a progress cost determined based at least in part on whether the autonomous vehicle, while traversing the trajectory, progressed towards a destination.

C: The system of paragraph A, wherein a first size of the first region is determined based at least in part on at least one of: a type of the object, a second size of the object, a kinematic of the autonomous vehicle, a velocity of the autonomous vehicle, semantic information of an environment proximate the autonomous vehicle, a difference of velocity between the autonomous vehicle and the object, or an orientation of the object.

D: The system of paragraph A, wherein a size of the second region is determined based at least in part on at least one of: a first velocity of the autonomous vehicle, a type of the object, a predicted acceleration of the object, a second velocity of the object, or a second size of the object.

E: The system of paragraph A, wherein the second cost is associated with at least one of: a comfort cost based at least in part on one or more of an acceleration or a jerk associated with the trajectory, or a policy cost associated with the autonomous vehicle complying with one or more laws or policies when controlled in accordance with the trajectory.

F: One or more non-transitory computer-readable media storing instructions executable by one or more processors, wherein the instructions, when executed, cause the one or more processors to perform operations comprising: determining a blocking object proximate travel of a vehicle; one or more of determining or receiving a first region proximate the blocking object, the first region indicating to increase a first cost associated with controlling the vehicle within the first region; one or more of determining or receiving a second region adjacent the first region, the second region indicating to decrease a second cost associated with controlling the vehicle within the second region; and determining, based at least in part on the first region and the second region, a cost associated with a trajectory for controlling the vehicle proximate the blocking object.

G: The one or more non-transitory computer-readable media of paragraph F, wherein the first cost is associated with progress to a destination along the trajectory.

H: The one or more non-transitory computer-readable media of paragraph F, wherein a first size of the first region is determined based at least in part on at least one of: a type of the blocking object, a size of the blocking object, a kinematic of the vehicle, semantic information of an environment proximate the vehicle, a velocity of the vehicle, a difference of speed between the vehicle and the blocking object, or an orientation of the blocking object.

I: The one or more non-transitory computer-readable media of paragraph F, wherein a size of the second region is determined based at least in part on at least one of: a first velocity of the vehicle, a type of the blocking object, a predicted acceleration of the blocking object, a second velocity of the blocking object, or a second size of the blocking object.

J: The one or more non-transitory computer-readable media of paragraph F, wherein determining the second cost is associated with one or more of comfort or policy along the trajectory.

K: The one or more non-transitory computer-readable media of paragraph F, wherein controlling the vehicle in accordance with the trajectory causes the vehicle to move at least partially into an oncoming lane of traffic.

L: The one or more non-transitory computer-readable media of paragraph F, wherein the second cost is associated with at least one of: a comfort cost based at least in part on one or more of an acceleration or a jerk associated with the trajectory, or a policy cost associated with the vehicle complying with one or more laws or policies when controlled in accordance with the trajectory.

M: The one or more non-transitory computer-readable media of paragraph F, wherein the operations further comprising: controlling the vehicle based at least in part on the trajectory.

N: A method comprising: determining a blocking object proximate travel of a vehicle; one or more of determining or receiving a first region proximate the blocking object, the first region indicating to increase a first cost associated with controlling the vehicle within the first region; one or more of determining or receiving a second region adjacent the first region, the second region indicating to decrease a second cost associated with controlling the vehicle within the second region; and determining, based at least in part on the first region and the second region, a cost associated with a trajectory for controlling the vehicle proximate the blocking object.

O: The method of paragraph N, wherein the first cost is associated with progress to a destination along the trajectory.

P: The method of paragraph N, wherein a first size of the first region is determined based at least in part on at least one of: a type of the blocking object, a size of the blocking object, a kinematic of the vehicle, semantic information of an environment proximate the vehicle, a velocity of the vehicle, a difference of speed between the vehicle and the blocking object, or an orientation of the blocking object.

Q: The method of paragraph N, wherein a size of the second region is determined based at least in part on at least one of: a first velocity of the vehicle, a type of the blocking object, a predicted acceleration of the blocking object, a second velocity of the blocking object, or a second size of the blocking object.

R: The method of paragraph N, wherein determining the second cost is associated with one or more of comfort or policy along the trajectory.

S: The method of paragraph N, wherein controlling the vehicle in accordance with the trajectory causes the vehicle to move at least partially into an oncoming lane of traffic.

T: The method of paragraph N, wherein the second cost is associated with at least one of: a comfort cost based at least in part on one or more of an acceleration or a jerk associated with the trajectory, or a policy cost associated with the vehicle complying with one or more laws or policies when controlled in accordance with the trajectory.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, “may,” “could,” “may” or “might,” unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase “at least one of X, Y or Z,” unless specifically stated otherwise, is to be understood to present that an item, term, etc. may be either X, Y, or Z, or any combination thereof, including multiples of each element. Unless explicitly described as singular, “a” means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

receiving, from a sensor device associated with an autonomous vehicle, sensor data from an environment;

determining that the autonomous vehicle is traveling in a first lane;

determining, based at least in part on the sensor data, an object proximate the autonomous vehicle is a double-parked vehicle;

determining a dilated representation of the object;

determining, based at least in part on a confidence level that the object will remain stationary, a capable acceleration of the object, the dilated representation of the object, and a current velocity of the autonomous vehicle, a first region surrounding the object, the first region including a first weight;

determining a second region adjacent the first region, the second region including a second weight that is different than the first weight;

generating, based at least in part on the first region and the second region, a trajectory associated with the autonomous vehicle;

generating a first cost associated with the trajectory and a second cost associated with the trajectory;

modifying, based at least in part on the trajectory passing through the first region, the first cost with the first weight resulting in a modified first cost that is increased from the first cost;

modifying, based at least in part on the trajectory passing through the second region, the second cost with the second weight resulting in a modified second cost that is decreased from the second cost; and controlling the autonomous vehicle based at least in part on the trajectory.

2. The system of claim 1, wherein the first cost is associated with a progress cost determined based at least in part on whether the autonomous vehicle, while traversing the trajectory, progressed towards a destination.

3. The system of claim 1, wherein a first size of the first region is determined based at least in part on at least one of:

a type of the object, a second size of the object, a kinematic of the autonomous vehicle, semantic information of the environment proximate the autonomous vehicle, a difference of velocity between the autonomous vehicle and the object, or an orientation of the object.

4. The system of claim 1, wherein a size of the second region is determined based at least in part on at least one of:

a first velocity of the autonomous vehicle, a type of the object, a predicted acceleration of the object, a second velocity of the object, or a second size of the object.

5. The system of claim 1, wherein the second cost is associated with at least one of:

a comfort cost based at least in part on one or more of an acceleration or a jerk associated with the trajectory, or a policy cost associated with the autonomous vehicle complying with one or more laws or policies when controlled in accordance with the trajectory.

6. The system of claim 1, wherein the second region surrounds the first region.

7. One or more non transitory computer readable media storing instructions executable by one or more processors, wherein the instructions, when executed, cause the one or more processors to perform operations comprising:

determining a blocking object proximate travel of a vehicle;

determining, based at least in part on a distance between the vehicle and the blocking object, a dilated representation of the blocking object;

one or more of determining or receiving, based at least in part on a confidence level that the blocking object will remain stationary, the dilated representation of the blocking object, a capable acceleration of the blocking object, and a current velocity of the vehicle, a first region proximate the blocking object, the first region including a first weight to increase a first cost associated with controlling the vehicle within the first region;

one or more of determining or receiving a second region adjacent the first region, the second region including a second weight to decrease a second cost associated with controlling the vehicle within the second region;

determining, based at least in part on the first weight and the first cost, a first modified cost;

determining, based at least in part on the second weight and the second cost, a second modified cost;

determining, based at least in part on the first modified cost and the second modified cost, a cost associated with a trajectory for controlling the vehicle proximate the blocking object; and controlling the vehicle based at least in part on the trajectory.

8. The one or more non transitory computer readable media of claim 7, wherein the first cost is associated with progress to a destination along the trajectory.

9. The one or more non transitory computer readable media of claim 7, wherein a first size of the first region is determined based at least in part on at least one of:

a type of the blocking object, a size of the blocking object, a kinematic of the vehicle, semantic information of an environment proximate the vehicle, a difference of speed between the vehicle and the blocking object, or an orientation of the blocking object.

10. The one or more non transitory computer readable media of claim 9, wherein a size of the second region is determined based at least in part on at least one of:

a first velocity of the vehicle, a type of the blocking object, a predicted acceleration of the blocking object, a second velocity of the blocking object, or a second size of the blocking object.

11. The one or more non transitory computer readable media of claim 9, wherein determining the second cost is associated with one or more of comfort or policy along the trajectory.

12. The one or more non transitory computer readable media of claim 7, wherein controlling the vehicle in accordance with the trajectory causes the vehicle to move at least partially into an oncoming lane of traffic.

13. The one or more non transitory computer readable media of claim 7, wherein the second cost is associated with at least one of:

a comfort cost based at least in part on one or more of an acceleration or a jerk associated with the trajectory, or a policy cost associated with the vehicle complying with one or more laws or policies when controlled in accordance with the trajectory.

14. A method comprising:

determining a blocking object proximate travel of a vehicle;

one or more of determining or receiving, based at least in part on a confidence level that the blocking object will remain stationary, a capable acceleration of the blocking object and a current velocity of the vehicle, a first region proximate the blocking object, the first region including a first weight to increase a first cost associated with controlling the vehicle within the first region;

one or more of determining or receiving a second region adjacent the first region, the second region including a second weight to decrease a second cost associated with controlling the vehicle within the second region;

determining, based at least in part on the first weight and the first cost, a first modified cost;

determining, based at least in part on the second weight and the second cost, a second modified cost;

determining, based at least in part on the first modified cost and the second modified cost, a cost associated with a trajectory for controlling the vehicle proximate the blocking object; and controlling the vehicle based at least in part on the trajectory.

15. The method of claim 14, wherein the first cost is associated with progress to a destination along the trajectory.

16. The method of claim 14, wherein a first size of the first region is determined based at least in part on at least one of:

a type of the blocking object, a size of the blocking object, a kinematic of the vehicle, semantic information of an environment proximate the vehicle, a difference of speed between the vehicle and the blocking object, or an orientation of the blocking object.

17. The method of claim 14, wherein a size of the second region is determined based at least in part on at least one of:

a first velocity of the vehicle, a type of the blocking object, a second velocity of the blocking object, or a second size of the blocking object.

18. The method of claim 14, wherein determining the second cost is associated with one or more of comfort or policy along the trajectory.

19. The method of claim 14, wherein controlling the vehicle in accordance with the trajectory causes the vehicle to move at least partially into an oncoming lane of traffic.

20. The method of claim 14, wherein the second cost is associated with at least one of:

a comfort cost based at least in part on one or more of an acceleration or a jerk associated with the trajectory, or a policy cost associated with the vehicle complying with one or more laws or policies when controlled in accordance with the trajectory.

* * * * *